United States Patent [19]
Hoo et al.

[11] Patent Number: 4,825,318
[45] Date of Patent: Apr. 25, 1989

[54] COMPOUND READ/WRITE ELEMENT FOR RIGID MAGNETIC DISK FILES

[75] Inventors: Stanley S. K. Hoo, San Jose, Calif.; Mark E. Re, Wheaton, Ill.

[73] Assignee: Carnegie-Mellon University, Pittsburgh, Pa.

[21] Appl. No.: 58,827

[22] Filed: Jun. 5, 1987

[51] Int. Cl.$^4$ .................. G11B 5/27; G11B 5/18
[52] U.S. Cl. .................. 360/121; 360/123; 360/126; 360/127
[58] Field of Search ............... 360/121, 119, 122-123, 360/125

[56] References Cited

U.S. PATENT DOCUMENTS

| | | | |
|---|---|---|---|
| 3,012,104 | 12/1961 | Kleis | 360/121 |
| 4,130,242 | 12/1978 | Mannion | 360/121 X |
| 4,404,609 | 9/1983 | Jones, Jr. | 360/121 X |
| 4,725,909 | 2/1988 | Kawai | 360/123 X |

FOREIGN PATENT DOCUMENTS 52-20810  2/1977  Japan ......................... 360/121

OTHER PUBLICATIONS

IBM/TDB "Two-Gap Read-Write Head" by Rogers et al vol. 12, No. 7, Dec. 1969, p. 1118.
IBM/TDB "Combined Long. & Vert. Magnetic Recording" by Hoagland vol. 20, No. 8, Jan. 1978, pp. 3311-3312.

Primary Examiner—John H. Wolff
Attorney, Agent, or Firm—Reed Smith Shaw & McClay

[57] ABSTRACT

An inductive vertical or horizontal read/write head element for use in rigid magnetic disk files. The element is comprised of at least three spaced apart poles, each of said poles having a flux path extending from said head means, magnetically connecting said path, and at least two electrical coils positioned about said flux paths for inducing a flux in said flux paths. The element also has tracking capabilities when the first and last poles are offset from the other poles, which are essentially aligned.

22 Claims, 10 Drawing Sheets

B-Fields emitted when writing a vertical medium

Vertical and horizontal components of the element B-fields of the present invention Conventional B-field (Prior Art)

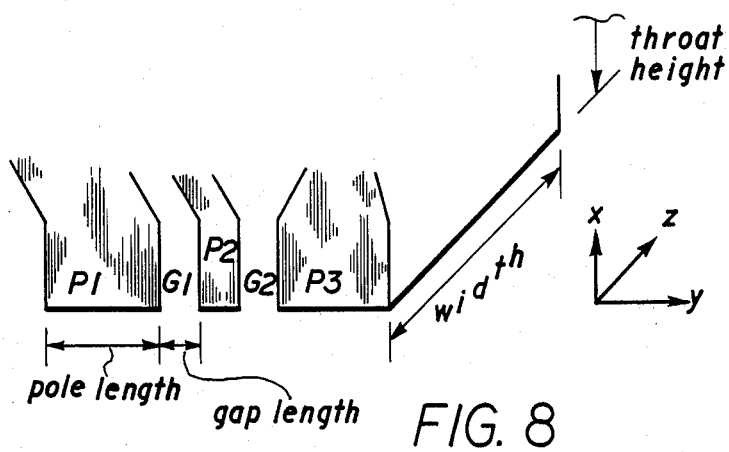
FIG. 8
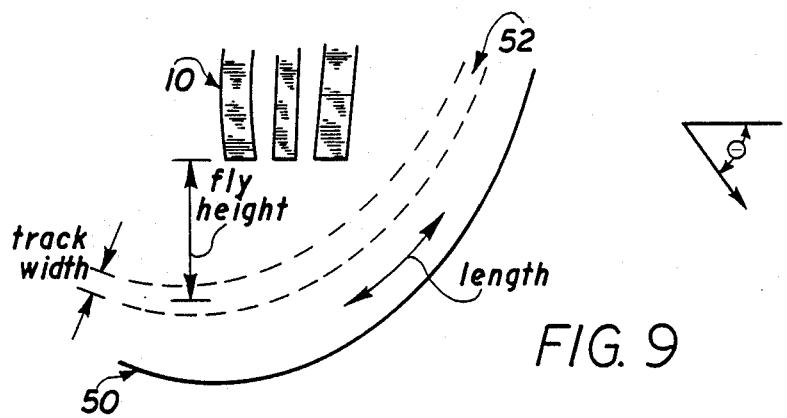
FIG. 9
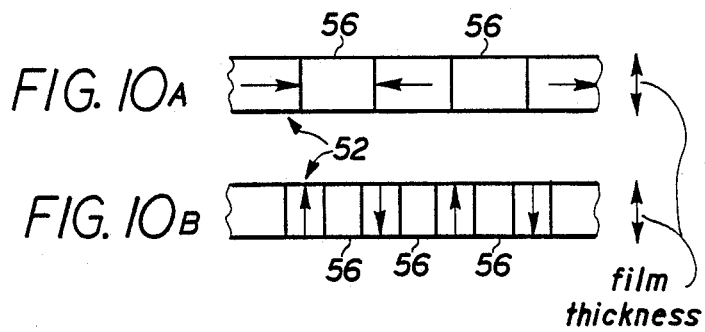
FIG. 10A
FIG. 10B

COMPOUND READ/WRITE ELEMENT FOR RIGID MAGNETIC DISK FILES

FIELD OF THE INVENTION

The invention relates to an inductive read/write element for use in rigid magnetic disk files and, in particular to three pole thin film compound magnetic read/write element.

BACKGROUND OF THE INVENTION

The use of magnetic heads in reading and writing from magnetic recording media is well known. For example, in U.S. Pat. No. 3,355,727 an improved recording head is disclosed in which a recording tip is positioned on a magnetic core shielded by a concentric magnetic shield. Additionally, thin film inductive transducers have been used to read and write to magnetic media. Of particular interest are the thin film single gap heads disclosed in "A Thin Film Head for Perpendicular Recording," J. App. Phys 53(3) March 1982; "Thin Film Head Study for Perpendicular Recording" IEEE Transactions on Magnetics Vol. MAG-17 No. 6 Nov. 81; D. P. Gregg, "Deposited Film Transducing Apparatus and Method of Producing the Apparatus", U.S. Pat. No. 3,344,237, Sept. 26, 1967; and J. Lazzari and I. Melnick, "Integrated Magnetic Recording HeadS", IEEE Transactions on Magnetics, Vol. MAG-7, No. 1, March 1971.

Unlike the single gap thin film heads, a double gap thin film inductive transducer is disclosed in U.S. Pat. No. 4,404,609. A three pole tip head is provided for perpendicular recording which has claimed advantages over the single gap or double pole-tip head.

However, none of the prior art read/write heads write a vertical medium at a distance and, in particular, a double sided thick substrate rigid disk. Accordingly, it is an object of the present to provide a novel thin film inductive transducer that provides a means of writing to rigid disks at a distance. A further object of the invention is to provide a transducer which can also read at a greater medium-to-element distance than prior art devices with a higher signal-to-noise ratio and better lineal resolution.

SUMMARY OF THE INVENTION

Generally, the present invention provides an inductive thin film element having at least a double gap using a compound structure. The structure includes at least three pole pieces and at least two independent current coils for providing a pair of flux paths in which the flux at the poles is either opposing or enabling, i.e., in the same direction.

By using a summation notation for easier identification of the poles, the poles could be identified as $$\sum_{j=1}^{K} P_j$$

where $P_j$ represents the $j^{th}$ pole, K is the total number of poles and j is a counter for the summation notation. Similarly, the lengths of the poles can be represented by $$\sum_{j=1}^{K} L_j,$$

where $L_j$ represents the $j^{th}$ length corresponding to the $j^{th}$ pole. The gaps can be represented by $$\sum_{j=1}^{K} g_j$$

where $g_j$ is the gap corresponding to the jth pole, and the electric coils can be represented by $$\sum_{j=1}^{K-1} C_j$$

where $C_j$ is the jth coil corresponding to the jth pole. Note with the gaps and the coils, the counter only goes to K−1. This is because in the nomenclature used here, the counting begins with the first pole. As the structure of the read/write element is followed lengthwise, the gaps and the coils within the gaps come after the poles except for the $PK^{th}$ pole. The $PK^{th}$ pole completes the structure with no gaps of coils thereafter. Thus there is no $K^{th}$ gap or $K^{th}$ coil.

For the situation where the read/write element operates in the horizontal mode, the P1 and PK poles have flux flowing oppositely in their respective flux paths. At the same time, the flux flowing in the center or $$L \sum_{j=2}^{K-1} P_j$$

poles will cancel out, essentially leaving only the fluxes of the P1 and PK poles to contribute to the magnetic field. The flux flowing in the center flux paths can be varied in direction to obtain a desired magnetic field. For example, in a three pole head, P1 and P3 have flux flowing in opposite directions, and P2 has little, or no, flux.

Preferably, the element takes advantage of offset pole pieces fabricated using thin film techniques such as plating or vacuum deposition. By virtue of the two independent current coils deposited on the element as a thin film of gold, copper or aluminum, alterable flux paths can be created which provide various application configurations in connection with the selected thickness of the center pole piece. For example, the present invention can be configured to perform:

(1) writing transitions in a vertical medium,
(2) reading the field from a vertical medium,
(3) writing a horizontal transition on a horizontal medium,
(4) writing transitions in an isotropic medium,
(5) reading transitions in an isotropic medium,
(6) reading a horizontal medium, writing on an isotope medium, reading on an isotope medium, and
(7) providing implicit track position information solely from the written data.

The current coils, each driving its own flux path, can generate the flux paths which are oppositely driven so that a predominantly vertical write-field is created. This results in an ability to create vertical magnetic transitions in the disk medium. On the other hand, when the flux paths are driven in the same direction, the element can write a longitudinal pattern in a manner similar to a conventional longitudinal head. By sensing the flux paths differentially, the present invention can read with a higher resolution than conventional read elements. This higher resolution is achieved while the element is further away from the disk medium.

Furthermore, the element of the present invention has differential reading ability in the lateral direction. Thus the head track-positioning function, (which is conventionally implemented by a separate head or a dedicated servo information record), is realized as well.

Because of the independent circuits and elements and the compound flux paths, the present invention also provided enhanced disk file features including greater track density, greater lineal density and implicit track-crossing and track following servomechanical systems. Other advantages of the present invention will become apparent from a perusal of the following detailed description of a presently preferred embodiments taken in connection with the accompanying drawings.

BRIEF DESCRIPTION OF THE DRAWING

FIG. 8 is an enlarged side view of a read/write element.

FIG. 9 is a side view of a data storage device.

FIGS. 10A and 10B show how the magnetic states align in a horizontal medium and a vertical medium, respectively.

PRESENTLY PREFERRED EMBODIMENTS

Figure 1A:
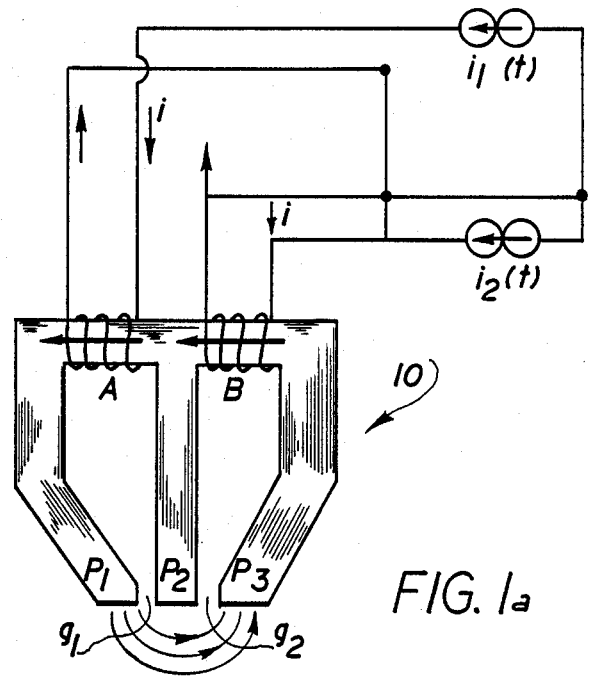
FIGS. 1a and 1b are diagrammatic representations of the element of the present invention configured in the enable and opposed flux modes, respectively.
Figure 1B:
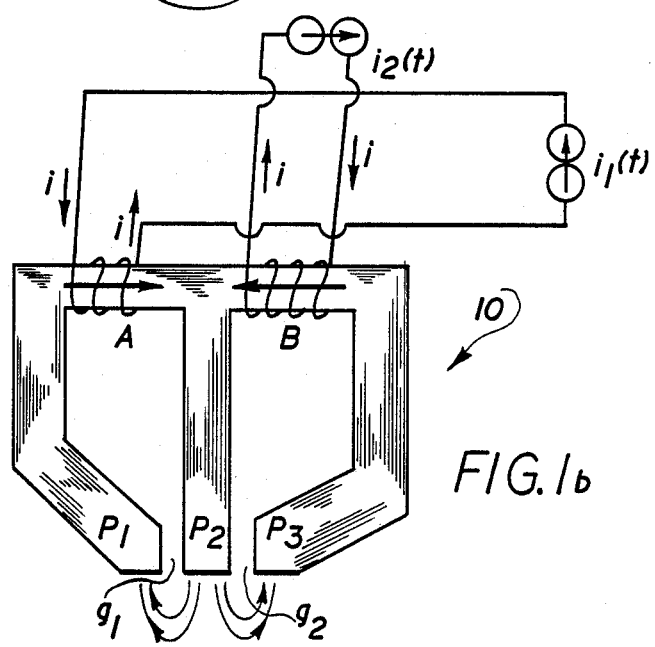
Figure 1C:
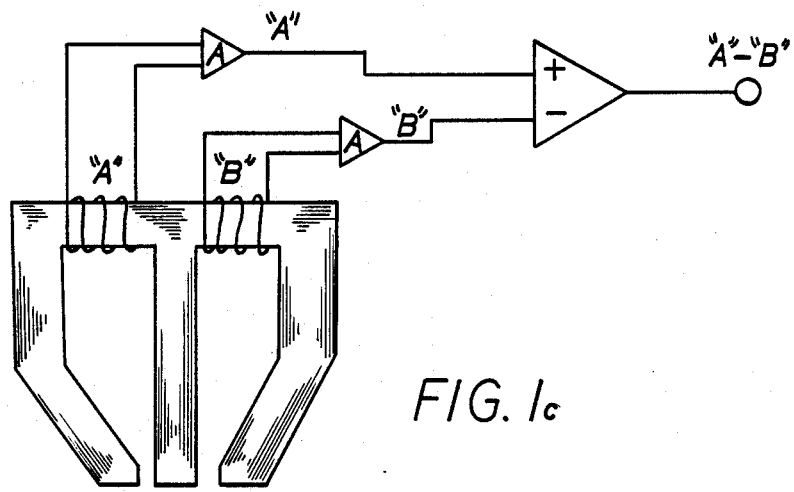
FIG. 1c is a schematic of a read sensing circuit illustrating a circuit for sensing induced voltage in electrical conductors when the element is reading.
Figure 2A:
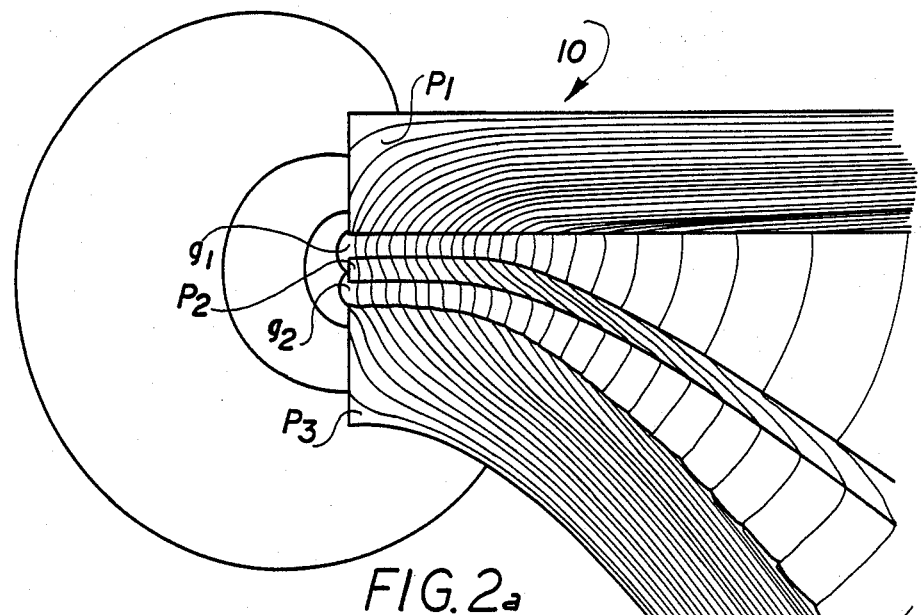
FIGS. 2a and 2b are enlarged views of the pole ends of the element showing the flux fields emitted from the magnetic paths in the enable and opposed flux modes, respectively.
Figure 2B:
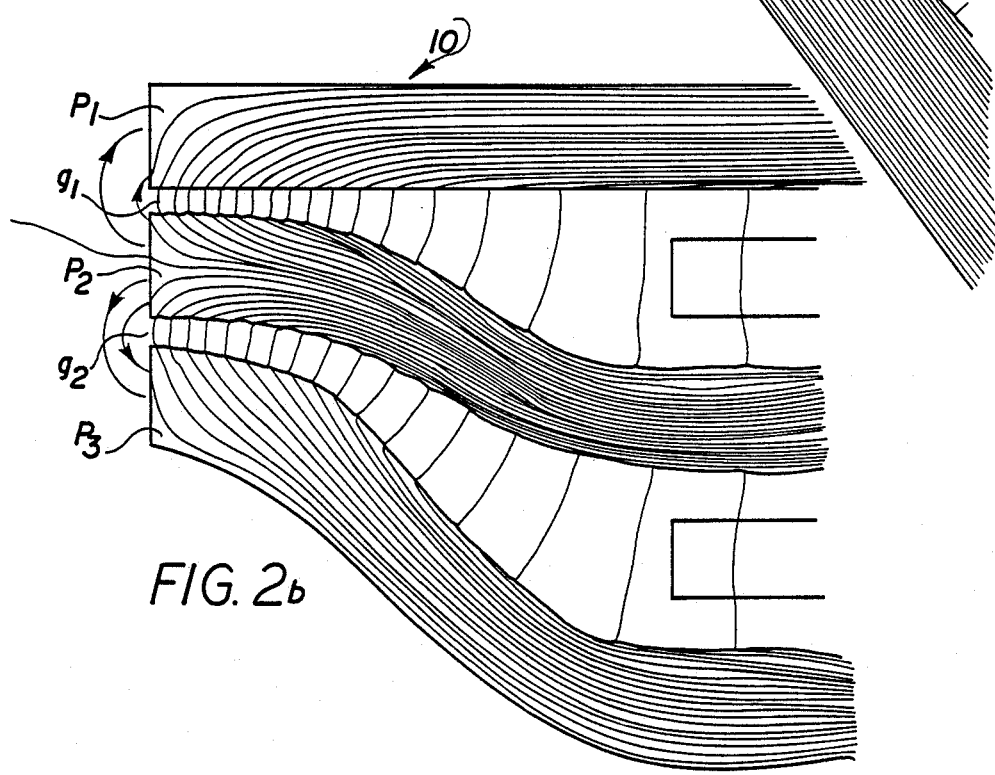

Referring to FIGS. 1a and 1b, magnetic read/write element 10 of the present invention is diagrammatically shown. Element 10 includes current sources $i_1$, and $i_2$ for independent coils A and B. Element 10 also includes poles $P_1$, $P_2$, and $P_3$ for providing enhanced or opposed flux fields. As shown in FIG. 1a, an enhanced or aided flux is provided for writing while in FIG. 1b opposed flux is generated. The enhanced and opposing flux fields are better shown in FIG. 2a and 2b, respectively. Gaps $g_1$ and $g_2$ provided between $P_1$ and $P_2$ and $P_2$ and $P_3$, respectively, are preferably about, for example, 0.5 μ. Poles $P_1$ and $P_3$ are, for instance, approximately 2.5 μ in thickness and 150 μ in length. Depending upon the configuration $P_2$ can be, for example, either, for example, 0.5 μ or 2.5 μ as described hereinafter. For purposes of the description, the following table sets out the various dimensional characteristics of the elements used herein.

TABLE

| | Permeability | Dimensions | |
|---|---|---|---|
| $P_1$, $P_3$ | 1000μ° | Thickness | 2.5μ |
| | | Length | 150μ |
| Thin $P_2$ | 1000μ° | Thickness | 0.5μ |
| Thick $P_2$ | 1000μ° | Thickness | 2.5μ |
| $C_1$, $C_2$ | μ° | Height | 3μ |
| | | Width | 6μ |
| $g_1$, $g_2$ | μ° | Thickness | 0.5μ |

Figure 3:
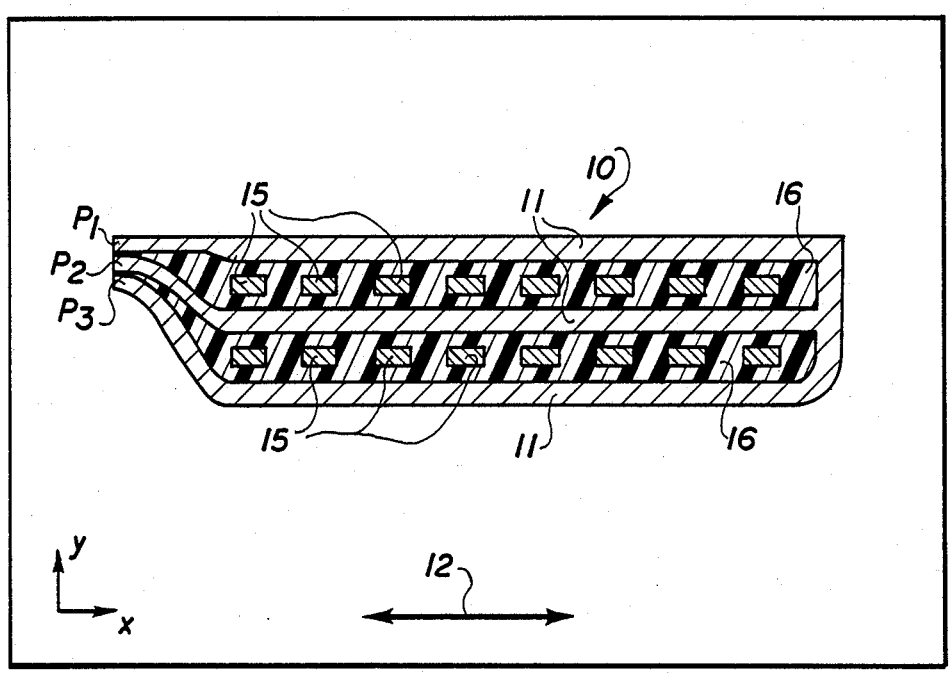
FIG. 3a is an enlarged side elevation of a preferred fabrication of the element using thin film techniques.
FIG. 3b is an enlarged overhead view of the element.

Referring to FIG. 3a, element 10 is preferably fabricated using conventional semi-conductor thin film processing techniques; however, other micro-fabrication techniques can obviously be used.

Element 10 includes flux paths 11 preferably vacuum deposited or plated soft magnetic films. Arrows 12 shows the axes of the hard uniaxial anisotropy direction which is desired for the magnetic material 11. Conductors 15 are preferably thin film depositions of gold, copper, aluminum or the like. Electrical insulator 16 is provided between flux paths 11 and conductors 15. Insulation 16 is not magnetically active and comprise glass, non-magnetic oxide, solid polymer or plastic material.

Figure 3B:
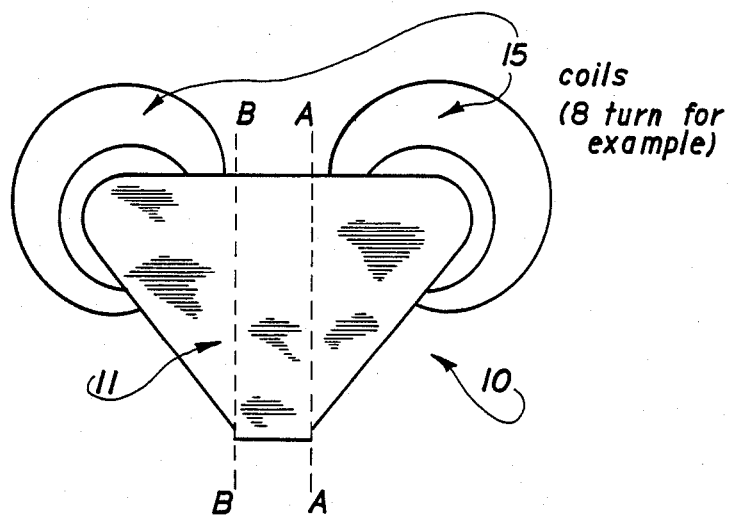

A top view of element 10 is shown in FIG. 3b. This view indicates a preferred position of the current carrying coils 15. It is noted that the coils are displaced from one another. This is done to reduce the amount of coupling between the two coils. All three poles can be nominally the same size, as shown in the figure, or the bottom pole (P1) and the top pole (P3) can be reduced in size, as shown by the dotted lines A and B. If the bottom pole is made to be from line A to the left, and the top pole is from line B to the right, the three poles will only overlap in the center region of the head, which defines the track width.

FIG. 8 shows an enlarged side view of element 10's tip and shows that the pole length and the gap length is measured along the Y axis, and the pole width is mesured along the Z axis. The height of the pole is measured along the X axis.

Figure 4A:
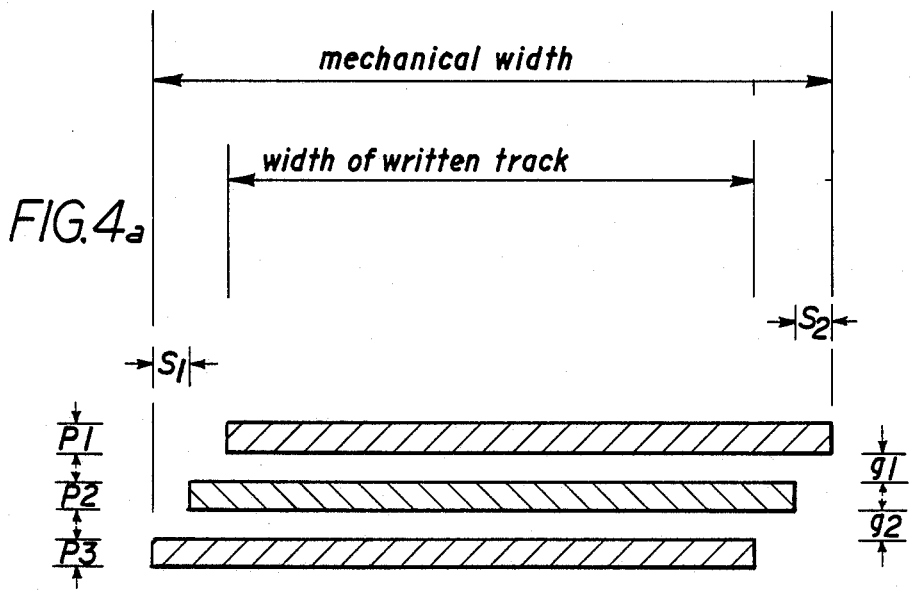
FIG. 4a-c are cross-sections of off-set poles of the element to achieve differential lateral sensing while reading a written track.

Referring to FIG. 4a, it is preferred that Pole pieces $P_1$ and $P_3$ be offset. $S_1$ and $S_2$ are the offset dimensions measured from $P_2$. The dimensional constraint of element 10 are set forth below:

$$S_1 = S_2$$

$$g_1 = g_2$$

$$g_1, g_2 < P_1, P_2, P_3; \text{ and}$$

$$S_{1,2} \approx 2g_{1,2}$$

The offset achieves differential lateral sensing while reading which will be more fully described hereinafter.

When current is passed through the conductors 15, an external B-field is created outside the poles. This field, when greater than the coercive force of the medium, switches the magnetic state of that medium. A vertical medium is switched by the vertical component of the external head B-field, (Bx). A longitudinal medium is switched by the horizontal component of the element field, (By). FIG. 10 shows how the magnetic states align in a cross section of a written track 52 in a horizontal medium, FIG. 10A, or a vertical medium, FIG. 10B. In a horizontal medium the magnetic states align parallel to the track 52 and in the plane of the disk 50. In a vertical medium the magnetic states align perpendicular to the plane of the disk 50. Note the transition zones 56 between the magnetic states.

To create a predominantly vertical write-head field, element 10 flux should be in the opposed mode (FIG. 1b). In that mode the center flux path carries the total flux generated by current circuits A and B. In order not to saturate this path, center pole P$_2$ has to be relatively large in cross-section, and is designated "thick" in the table above. Referring to FIG. 4a, the preferred element geometry for writing on a vertical medium is:

$$\tfrac{1}{2}P_2 \approx P_1 \approx P_3 > G_1 \approx G_2$$

Figure 5A:
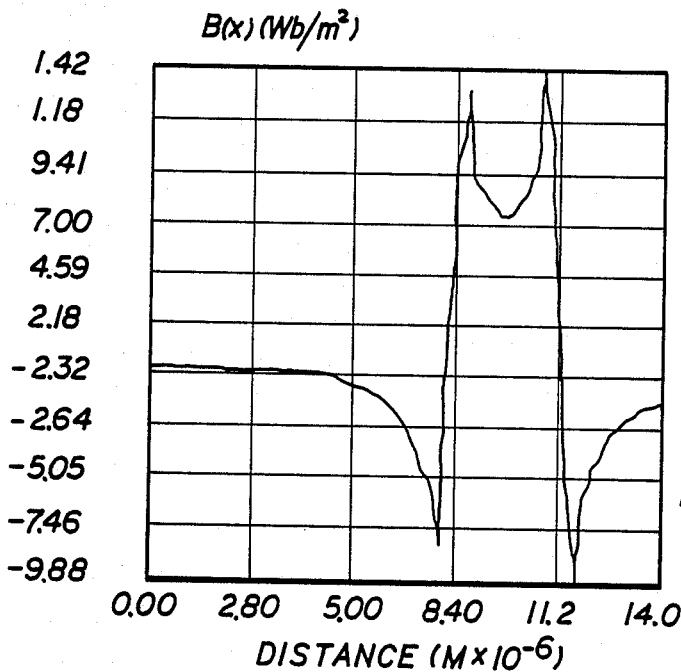
FIGS. 5a, 5b, 6a, 6b, 7a, and 7b are B-field plots of the element of the present invention in various configuration generated with computer aided magnetic field analysis.
Figure 5B:
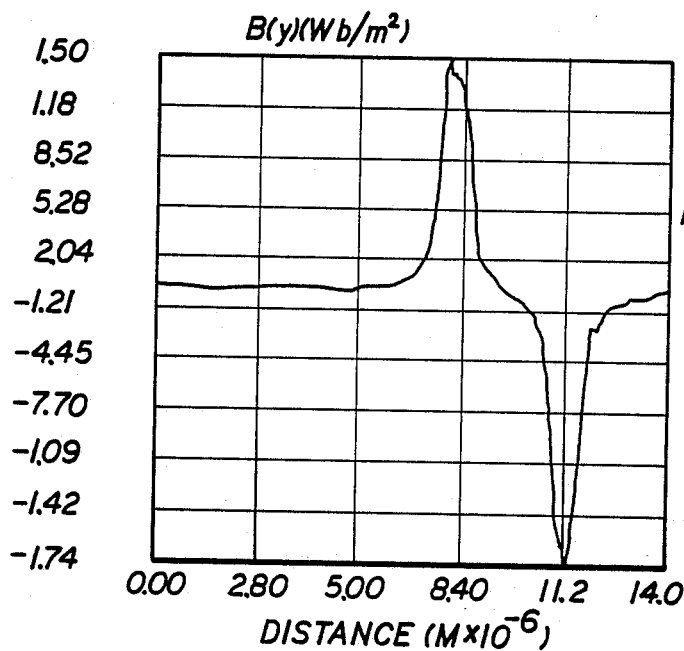

With reference to FIGS. 5a and 5b, the B-fields emitted from the element 10 when writing a vertical medium are shown. Current in each coil (A and B) is 50 milli-amperes, peak to peak for the calculations.

The B-field plots shown were generated with a computer aided magnetic field analysis program. The accuracy of this program was verified against actual field measurements on an IBM 3380 thin film head, which has a similar but simpler structure.

To create a predominantly horizontal field at the medium, the flux from the two path should enhance each other. In this application, the center flux path carries very little flux and, hence, can be much thinner than the other two poles. Thus, the preferred geometries is:

$$P_2 < P_1 \approx P_3 > G_1 \approx G_2$$

Figure 6A:
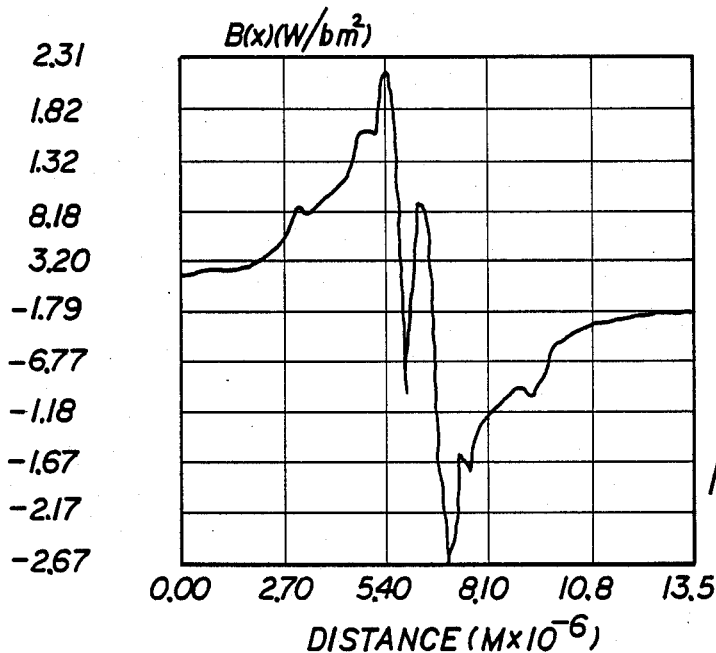
Figure 6B:
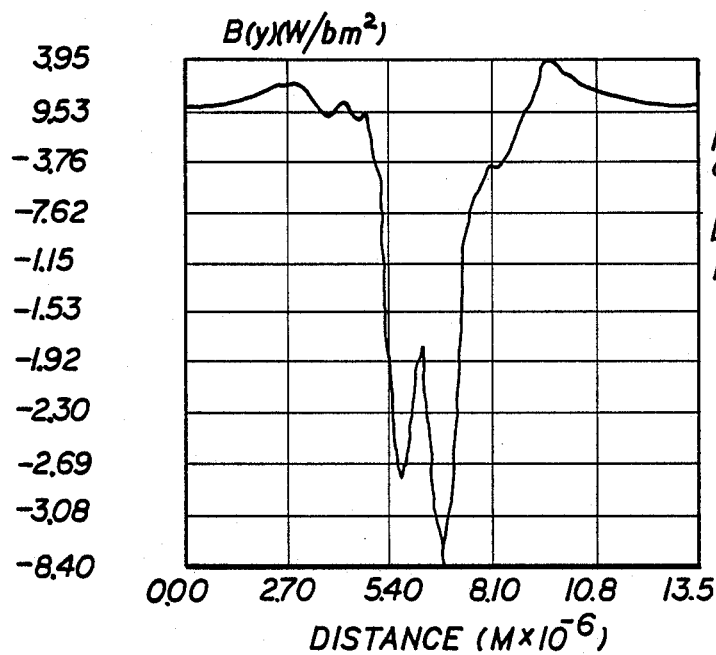
Figure 7A:
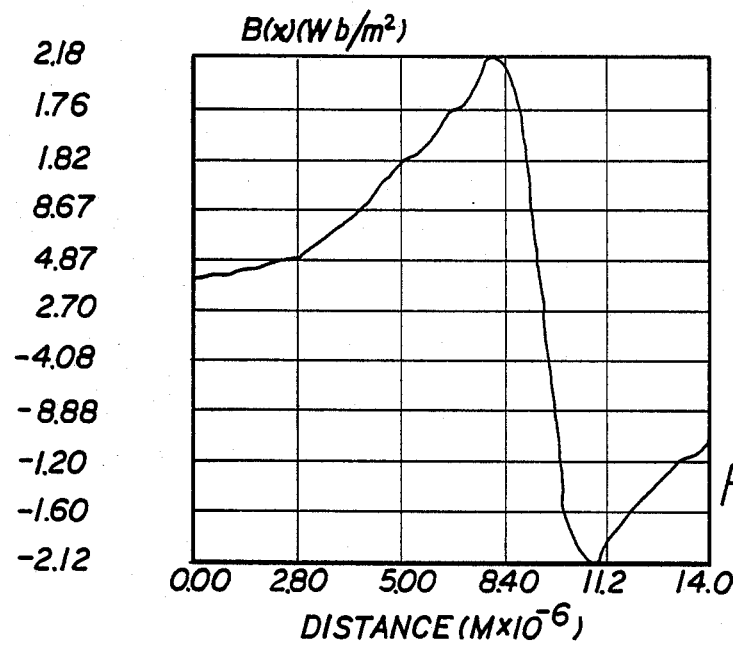
Figure 7B:
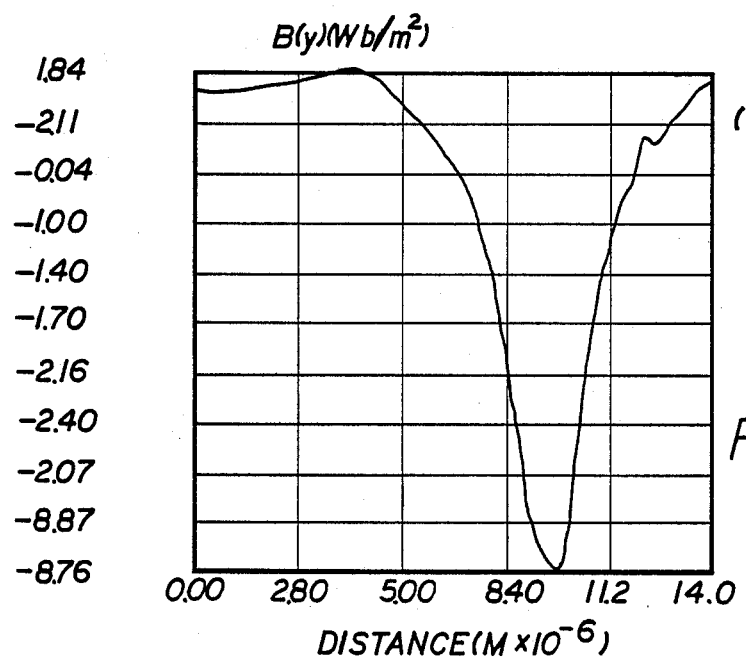

In FIGS. 6a and 6b, the vertical and horizontal components of the B-fields of element 10 are graphically shown. For comparison purposes, the fields from a conventional single flux-path element were calculated. The vertical and horizontal B-fields for this prior art element are shown in FIGS. 7a and 7b. For the calculations for the conventional single coil element; all dimensions and materials properties are the same as above, except the current is 100 milli-amps (to equalize the ampere-turns).

It is known that the reading ability of an inductive element, based upon the reciprocity principle, can be obtained from its characteristic function; that is, the B$_x$(x,y) and B$_y$(x,y) plots shown in FIGS. 5-7.

Since in element 10, current paths A and B are independent, the best configuration can be selected to optimize both writing and reading. During read, for example, the flux in the magnetic poles is much less than during write. This is also true of the center pole where the application is longitudinal recording, i.e. writing in the flux enhanced mode, so that the center pole P$_2$ can be thin. In this configuration the read resolution is improved by differential detection. A thick center pole P$_2$ required to write a vertical medium and the reading can again be differential. Accordingly, there is a great deal of freedom to configure element 10 for selected uses leads to the following claims:

(a) The write field from element 10 (FIG. 6b) is essentially as sharp as the write field of the prior art evidenced in FIG. 7b. When element 10 reads in the "opposed while reading" mode, the read-back transition is much sharper than a conventional single coil inductive element. See, e.g., B$_y$ in FIG. 5b which is clearly sharper than the B$_y$ of 7b, the conventional element. Element 10 can be used to read with a higher longitudinal resolution than convention single gap inductive heads, at comparable element-to-disk spacings. Or, element 10 can also be made to read with the same resolution, but spaced further from the disk. Both of these provide substantial advantages over existing devices.

In this application the preferred element geometry is a thin P$_2$.

(b) For vertical medium: This configuration is straightforward. The preferred element geometry for this application is a thick P$_2$; the B-fields plots of FIGS. 5a and 5b clearly show the ability of element 10 to write and read a vertical medium.

Lateral Track Position Sensitivity

Figure 4B:
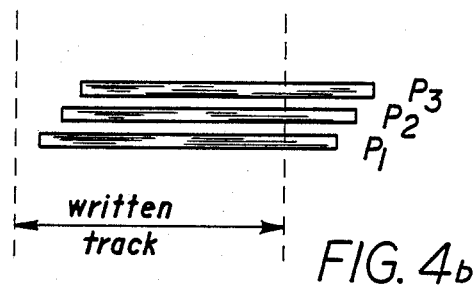
Figure 4C:
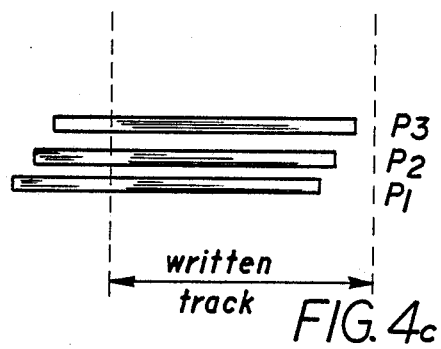

FIG. 4a shows the lateral (or disk radial direction) offset S$_{1,2}$ of the two flux paths. Thus, during read, the flux coupled into each path will have a lateral offset. Since the sensing coils are independent during read, the signal amplitudes at each coil will be equal only when element 10 is dead center over the written track. If there is a lateral offset in the track position of the element radial position, the difference of the average amplitudes of the read signals will not be zero. A positive difference indicates the element is off center to the left as shown in FIGS. 4b and 4c. Similarly, a negative difference indicates that element is radially off in the other direction, i.e., to the right as in FIG. 4c.

FIG. 9 shows an element 10 at some predetermined height above a magnetic storage medium such as a disk 50. A track 52 is shown on disk 50. The track width is measured in the radial direction of the disk 50 and the track length is measured in the θ direction.

The ability of element 10 to know its precise position relative to the disk track is a major advantage over conventional elements. By performing an amplitude average on the two signals, and comparing them, the precise position of the element is known in real-time. It should be noted that during "write" element 10 is "blind." However this can be overcome in, for example, files having two heads per arm. While one head is writing, its "mate" can be reading in order to provide track positioning information.

Accordingly, element 10 is capable of writing as dense as today's best write elements and to read, at a greater medium-to-element distance, with a higher signal/noise ratio, and better lineal resolution than prior elements. In addition the element 10 has the capability of lateral positional sensing. These advantages result in one or more of the following disk file features:

(a) greater track density (due to lower common mode noise);

(b) implicit track-crossing and track-following servomechanism system, which is based on tracking the actual data track. This factor alone can increase track density. If it only equals to state of the art explicit servo system, the use of element 10 will free up to 20% of the storage capacity of the file for data. That much capacity is, at present, being occupied by "servo information;"

(c) increased "flying height," which reduces the smoothness requirements on the disk surface and/or increases mechanical durability and reliability;

(d) greater lineal density (presently, files are not write density limited, but read limited). The sharper spatial B$_x$ and B$_y$ curves indicate less inter-symbol "bit shift" and amplitude reduction due to lineal crowding.

To facilitate understanding, the read/write element has been described herein as a three pole structure. However, the invention is not limited thereto. The read/write element can have more than three poles. For a vertical read/write element, the flux in the outer two, or first and last, flux paths flows in the same direction, and adds in the center poles. Of course, the flux direction of the center flux paths can be varied to achieve a specific external vertical magnetic field according to the principal of superposition.

Accordingly, while presently preferred embodiments of the invention have been shown and described in particularity, it may be otherwise embodied within the scope of the appended claims.

What is claimed is:

1. An inductive read/write head element comprising three spaced apart poles $P_1$, $P_2$ and $P_3$, pole $P_2$ comprising the center pole, each of said poles having a flux path extending from said head element; first and second electrical coils positioned about said flux paths for inducing a flux in said flux paths; and electrical insulation disposed between the flux paths and the coils, said poles $P_1$, $P_2$ and $P_3$, flux paths, first and second electrical coils and insulation produced by thin film techniques.

2. An inductive read/write head element claimed in claim 1, wherein poles $P_1$ and $P_3$ are offset from center pole $P_2$ a distance $S_1$ and $S_2$, respectively, and $S_1 = S_2$.

3. An inductive head element as set forth in claim 1, wherein the space between pole $P_1$ and $P_2$ is $g_1$ and the space between poles $P_2$ and $P_3$ is $g_2$ and wherein $g_1 = g_2$.

4. An inductive read/write head element comprising:

$$\sum_{j=1}^{K} P_j$$

magnetic poles, with Pole P1 being the first pole and PK being the last pole, and having lengths L1 and LK respectively, and separated by magnetically inert gaps having length $$\sum_{j=1}^{K-1} g_j,$$

respectively, each of said poles having a flux path extending therefrom, K being greater than or equal to three and j being a counter;

$$\sum_{j=1}^{K} C_j$$

electric coils electrically isolated and positioned between the respective flux paths of the poles for inducing a flux in the respective gaps and in said flux paths and producing a magnetomotive force therein which in turn causes magnetic fields to be emitted from the poles; and electrical insulation disposed between the flux paths and the coils, said poles, flux paths, coils and insulation produced by thin film techniques.

5. A head element as described in claim 4 having the following length relationship between the poles and the gaps of the element:

$$L1 = LK = 2 \sum_{j=2}^{K-1} L_j \text{ and (e.g. for } K = 3; L1 = L3 = 2L2\text{)}$$

each pole being of greater length than the length of the gaps which are approximately equal.

6. A read/write element as described in claim 4 wherein Pole P1 and Pole PK are laterally offset by an amount S1 and S2 respectively from the other poles which are essentially aligned and having the following size relationship relative to the poles and the gaps:

$$S1 = S2 > G1 + \frac{L1}{2}, L1 = LK$$

and the gaps approximately being equal in length, wherein the offset poles are able to provide knowledge of the position of the head element with respect to an external track that is magnetically defined.

7. A read/write head element as described in claim 4 wherein the gap between pole P1 and pole P2 is equal in length to the gap between the pole PK−1 and pole PK.

8. In a data storage device having a rotating disk whose surface contains a storage medium, on close proximity to the surface, an element for altering the magnetic state in small regions of the medium and inductively converting the written translations in the medium into a sensed voltage signal comprising:

$$\sum_{j=1}^{K} P_j$$

magnetic poles, with pole P1 being the first pole and PK being the last pole, and having lengths $$\sum_{j=1}^{K} L_j$$

respectively, and separated by magnetically insert gaps having length $$\sum_{j=1}^{K-1} g_j,$$

respectively, said magnetic poles facing the switchable material, each of said poles having a flux path extending therefrom K being greater than or equal to three and j being a counter;

$$\sum_{j=1}^{K-1} C_j$$

electric coils electrically isolated and positioned between the respective flux paths of the poles for inducing a flux in the respective gaps and in said flux paths and producing a magnetomotive force therein which in turn causes magnetic fields to be emitted from the poles; electrical insulation disposed between the flux paths and the coils, said poles, flux paths, coils and insulation produced by thin film techniques; and means for applying electrical current to each coil.

9. A device as described in claim 8 which includes a tracking means for determining where the poles are relative to the surfaces of the rotating disks.

10. A device as described in claim 9 wherein the tracking means is comprised of:

means for sensing the induced voltages developed across each coil when magnetic transitions in the storage medium are travelling past the poles;

means to time-average said sensed voltages from each pole;

means to differentially analyze the time-averaged sensed voltages from pairs of poles to determine the location of the poles relative to the surfaces of the rotating disks; and means responsive to the amplitudes and the signs of the differential time-averaged voltages for controlling the position of the poles relative to the surfaces of the disks.

11. A device as described in claim 8 suitable for writing in vertical magnetic storage medium having the following length relationship between the poles, and the gaps of the element:

$$L1 = L_k = \tfrac{1}{2} \sum_{j=2}^{K-1} Lj \text{ (e.g. for } K = 3, L1 = L3 = \tfrac{1}{2}L2\text{)}$$

and each pole being of greater length than the length of the gaps which are approximately equal;

the applied electrical currents in the coils of the P1 and PK poles are such that their respective magnetomotive forces are approximately equal in amplitude and in the same direction, and the applied electrical currents in the coils of the other poles are such that their respective magnetomotive forces are approximately equal in amplitude and parallel in direction.

12. A device as described in claim 8 suitable for writing in horizontal magnetic storage medium having the following length relationship between the poles and the gaps of the element:

$$\sum_{j=2}^{K-1} Lj < L1 = L_K, \text{ (e.g. for } K = 3; L2 < L1 = L3\text{)}$$

L1 being larger than the length of the gaps which are approximately equal;

the applied electrical currents in the coils of the P1 and PK poles are such that their respective magnetomotive forces are approximately equal in amplitude and in the opposite direction; and the applied electrical currents in the coils of the other poles are such that their respective magnetomotive forces cancel each other out.

13. A device as described in claim 8 for reading, wherein one of said magnetic poles facing the storage means senses the magnetic transitions in the medium.

14. A device as described in claim 8 suitable for reading a recording medium which is horizontally magnetized having the following length relationship between the poles and the gaps at the element:

$$\sum_{j=2}^{K-1} Lj < L1 = L_K \text{ (e.g. for } K = 3; L2 < L1 = L3\text{)}$$

and L1 being larger than the length of the gaps which are approximately equal, and wherein the differential voltage from each pole pair is used for sensing magnetic transitions in the medium.

15. A device as described in claim 14 wherein the sensed differential voltage amplitude drops off with increasing vertical distance between the poles of the element and the medium but said drop-off being less than the sensed voltage amplitude drop-off of each of the poles acting alone.

16. A device as described in claim 14 wherein the same direction magnetomotive forces can alter the magnetic state of the vertical storage medium from a greater distance than when the magnetomotive forces are not in the same direction.

17. A device as described in claim 8 suitable for reading a recording medium which is vertically magnetized having the following length relationship between the poles and the gaps of the element:

$$L1 = L_K = \tfrac{1}{2} \sum_{j=2}^{K-1} Lj \text{ (e.g. for } K = 3; L1 = L3 = \tfrac{1}{2}L2\text{)}$$

and each pole being of greater length than the length of the gaps which are approximately equal; and wherein the sum of the voltages from each pole pair is used for sensing magnetic transitions in the medium.

18. A device according to claim 8 for reading wherein the P1 pole and the PK pole are laterally offset by a length S1 and S2, respectively, from the other poles which are essentially aligned, and having the following size relationship relative to the poles and the gaps:

S1=S2>G1+½L1, L1=LK and the gaps being essentially equal in length, wherein the differential analyzed time-averaged voltage from pole pair L1 and L2 and pole pair Lk-1 and LK provide knowledge of the position of each pole pair relative to a written track's center in the storage medium as follows:

a. the pole pair is on track center when the analyzed voltage is zero or at a minimum, b. the pole pair is off to one side of the track when analyzed signal is positive or more positive than said minimum, c. the pole pair is off to the track's other side when the analyzed signal is negative or more negative than said minimum.

19. A device as described in claim 18 which includes at least one additional such device, said devices being mutually spaced a fixed distance apart, and wherein the differential analyzed time-averaged voltage from a subset of the devices provide track position knowledge while the remainder of the devices write.

20. A device as described in claim 18 wherein the size of the lateral offsets are smaller than one-half of the width of the written track in the storage medium.

21. A device as described in claim 18 wherein the position knowledge is sensitive to tracking errors as small as, or smaller than the size of the lateral offset between the poles.

22. A device as described in claim 8 wherein the combined dimensions of any pair of poles and the gap between them is larger than the magnetic transition lengths of the storage medium.

* * * * *